June 11, 1968 J. A. LUKES 3,388,385

NONDESTRUCTIVE ROUND-OFF DISPLAY CIRCUIT

Filed May 19, 1966 2 Sheets-Sheet 1

INVENTOR
JOSEPH ANTHONY LUKES
BY A. C. Smith
ATTORNEY

June 11, 1968 J. A. LUKES 3,388,385

NONDESTRUCTIVE ROUND-OFF DISPLAY CIRCUIT

Filed May 19, 1966 2 Sheets-Sheet 2

INVENTOR
JOSEPH ANTHONY LUKES
BY A. C. Smith
ATTORNEY

United States Patent Office 3,388,385
Patented June 11, 1968

3,388,385
NONDESTRUCTIVE ROUND-OFF DISPLAY CIRCUIT

Joseph A. Lukes, Palo Alto, Calif., assignor to Hewlett-Packard Company, Palo Alto, Calif., a corporation of California Filed May 19, 1966, Ser. No. 551,461
7 Claims. (Cl. 340—172.5)

Figure 1:
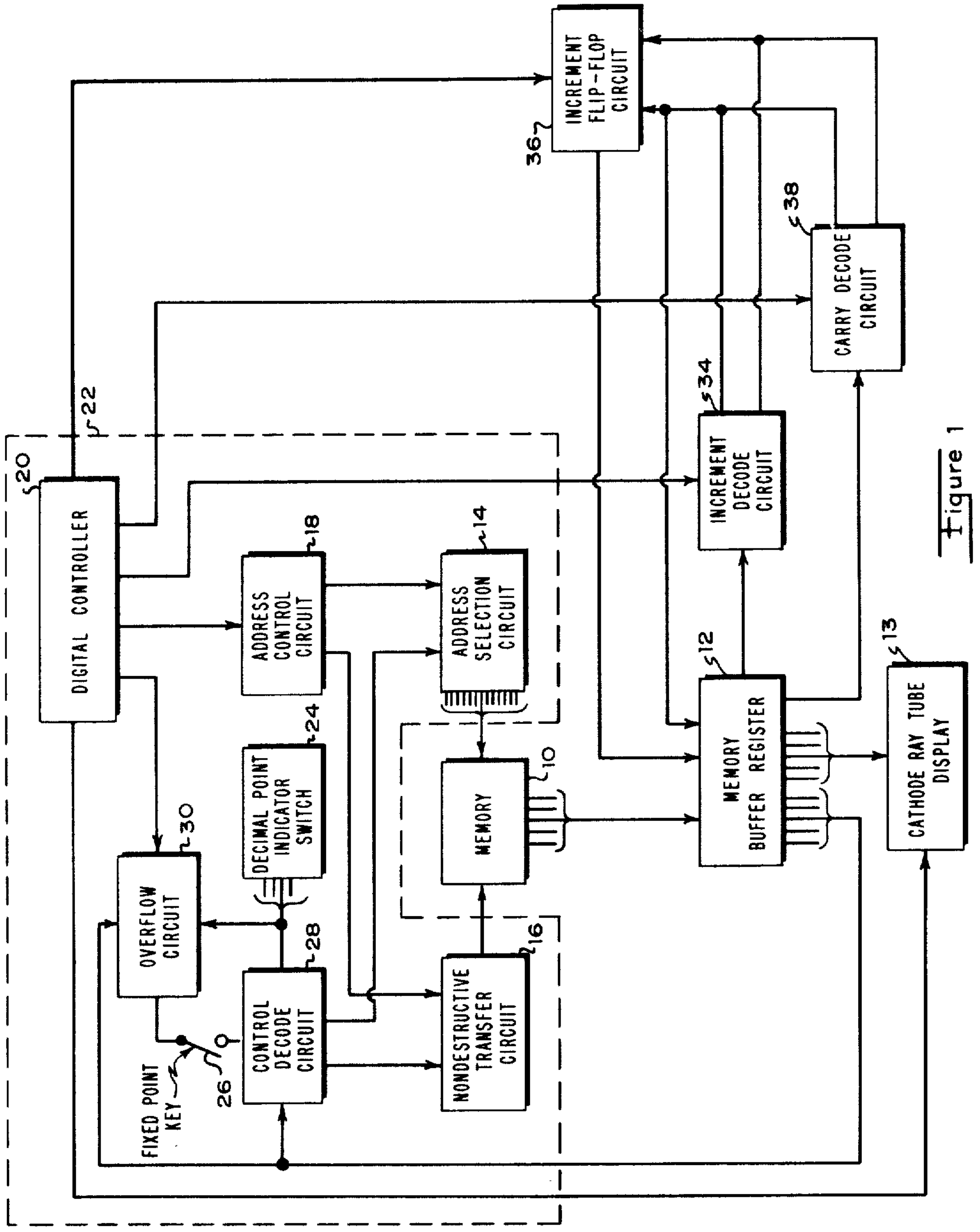

This invention relates to round-off display circuits for processing without altering a stored number so as to display the number in fixed point notation rounded off to the least significant place that can be displayed following the decimal point.

Fixed point notation refers to representing a number by fixing the position of the decimal point and by placing each digit in a fixed positional relationship to the decimal point so as to completely define the number. For example, the numbers "+123456.7890" and "−12.34098765" would be displayed together in fixed point notation as follows:

+123456.78900000
−12.34098765

This differs from floating point notation which refers to representing a number by moving the decimal point so that all the digits of the number but the first digit follow the decimal point and by multiplying the number by ten raised to a power which defines the number by indicating both the direction and the number of places the decimal point is moved. For example, the numbers displayed above in fixed point notation would be displayed together as follows in floating point notation:

+1.234567890 +5
−1.234098765 +1 where for each floating point number the grouping of digits about the decimal point is referred to as the mantissa and the digit to the right of the mantissa is the power to which a mantissa multiplier of ten must be raised to define the number and is referred to as the exponent.

It is desirable to store numbers in the memory of a calculating system in floating point notation because a greater range of multiple digit numbers can be stored accurately to a greater number of places in this notation than in fixed point notation. However, it is also desirable such as when nontechnical people are reading the numerical results of a calculation to be able to display the stored floating point numbers in fixed point notation. One problem in doing this, as indicated above by the greater number of display positions required to display the numbers "+123456.7890" and "−12.34098765" together in fixed point notation than in floating point notation, is that for a given number of display positions decimal numbers may be stored and displayed in floating point notation which cannot be displayed in their entirety in fixed point notation. Thus, the displayed fixed point numbers are inaccurate due to the truncation of undisplayed digits. Moreover, in conventional display circuits the undisplayed digits are typically destroyed, in other words, removed in the displaying process from storage in the memory so that the stored numbers are inaccurate to the same extent as the display. This inaccuracy is therefore accumulated during subsequent calculating operations involving the same numbers. The inaccuracy resulting from destroying the undisplayed digits may be minimized by rounding off the fixed point display of the numbers to the least significant place that can be displayed so as to reflect the value of the undisplayed digits. However, even this minimal inaccuracy may be accumulated into a large error during subsequent calculating operations involving the same numbers because of the concomitant rounding off of the number left in storage.

Accordingly, it is the principal object of this invention to provide a round-off display circuit for processing a number stored in a memory in floating point notation to display the number in fixed point notation rounded off to the least significant place that can be displayed without altering the storage of the number in the memory so that the inaccuracy of the rounded-off fixed point display of the number is not accumulated during subsequent calculating operations involving the same number.

A more general object of this invention is to provide a nondestructive round-off display circuit for use in a calculating system.

These objects are accomplished according to the illustrated embodiment of this invention by providing a memory for storing a number in floating point notation and by connecting a memory buffer register thereto for storing a digit of the number stored in the memory. Control means is provided for successively and singly storing in the memory buffer register each digit of the number, beginning with one digit less than the least significant digit that can be displayed, without altering storage of the number in the memory. Incrementing means is connected to the memory buffer register and is responsive to storage therein of the one digit when it is greater than four for subsequently incrementing the least significant digit by one when it is stored in the memory buffer register. Similarly, carry means is connected to the memory buffer register and is responsive to storage therein of a digit when it is incremented by the incrementing means from "9" to "0" for subsequently incrementing the next least significant digit by one when it is stored in the memory buffer register. A cathode ray tube display is also connected to the memory buffer register for displaying the selected number in rounded off fixed point notation.

Figure 2:
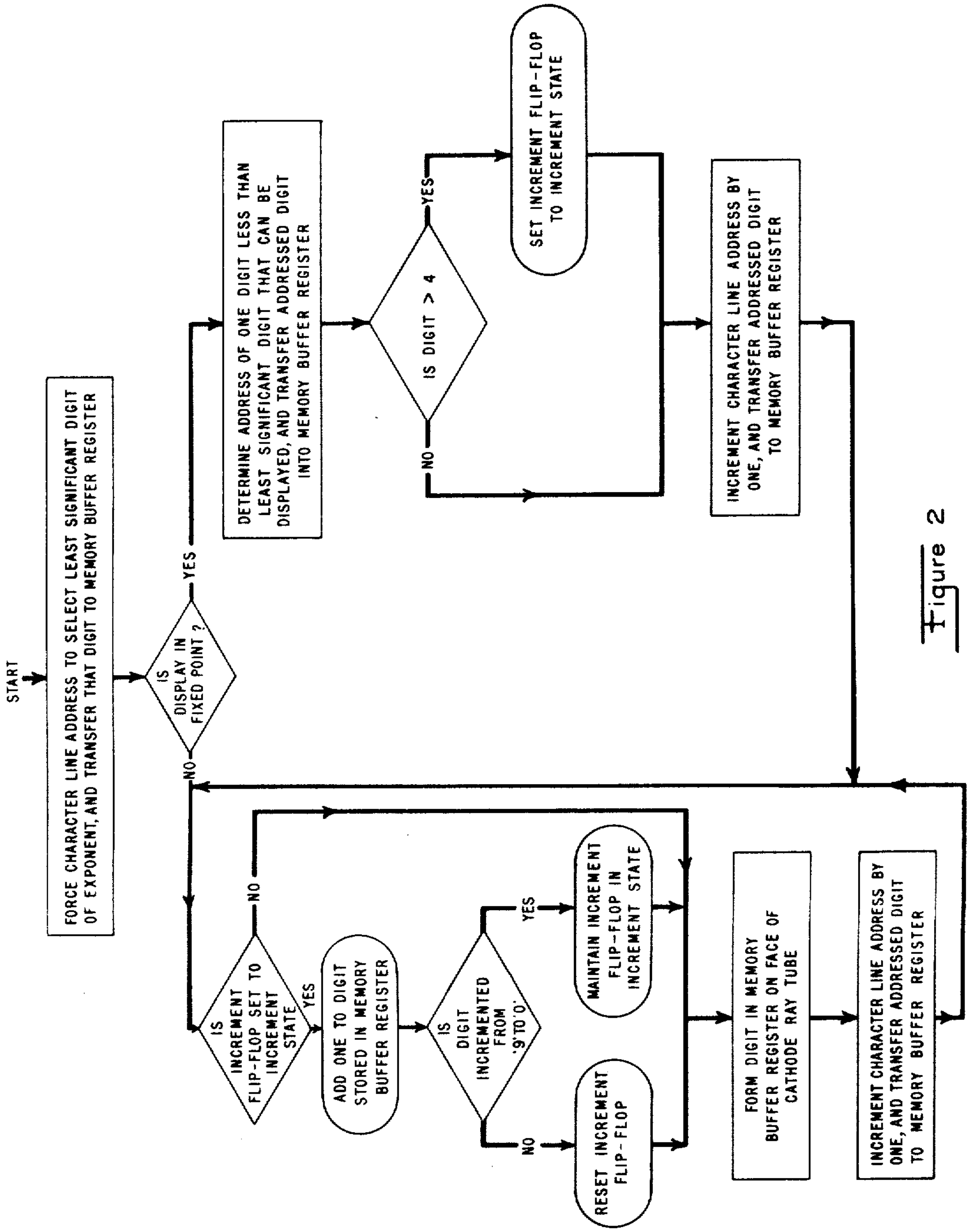

Other and incidental objects of this invention will be apparent from a reading of this specification and an inspection of the accompanying drawing in which:

FIGURE 1 is a block diagram of a nondestructive round-off display circuit according to the preferred embodiment of this invention and FIGURE 2 is a flow diagram illustrating the operation and sequencing of the round-off display circuit of FIGURE 1.

Referring now to FIGURES 1 and 2, there is shown a memory 10 for storing a number such as, for example, the number "−12.34098765" in natural binary-coded-decimal floating point notation as follows:

−1.234098765 +1 where the decimal digits "0", "1" . . . "9" are stored in the memory as the four-bit numbers "0000", "0001" . . . "1111". The sign information is stored in the memory as a fifth bit associated with the four-bit numbers representing the most significant digit of the mantissa and the most significant digit of the exponent. Thus, reference to a digit is hereinafter taken to mean the absolute value of the digit as well as the sign, if any, associated therewith. This memory 10, which may be the memory unit of a calculating system, commonly comprises an array of magnetic cores arranged and interconnected to form word planes each of which includes a group of character lines. The floating point number "−1.234098765 +1" is stored in a selected word plane by storing each digit of the mantissa and of the exponent in a different one of the character lines of that word plane. These character lines of the selected word plane, like those of the other word planes, are assigned binary addresses as generally indicated by the following:

| −1. | 2 | 3 | 4 | 0 | 9 | 8 | 7 | 6 | 5 | +1 |
|---|---|---|---|---|---|---|---|---|---|---|
| $M_9$ | $M_8$ | $M_7$ | $M_6$ | $M_5$ | $M_4$ | $M_3$ | $M_2$ | $M_1$ | $M_0$ | $E_0$ |

where each of the M subscripts represents the address of the character line in which the adjacent mantissa digit is stored and the E subscript represents the address of the character line in which the adjacent exponent digit is stored. The M and E subscripts also represent the display positions of the adjacent mantissa and exponent digits.

A memory buffer register 12 comprising an array of flip-flops is connected to the memory 10 for storing a digit of the number to be displayed without altering the storage of that digit in its associated character line in the memory 10. The memory buffer register 12 stores only one digit at a time so that when a digit is stored in the memory buffer register any other digit that may have been previously stored therein is automatically destroyed. A cathode ray tube display 13 having, for example, thirteen display positions is connected to the memory buffer register 12 for forming selected digits stored in the memory buffer register on the face of the cathode ray tube.

For purposes of illustrating my invention it is assumed that the floating point number "−1.234098765 +1" stored in the memory 10 is to be displayed in fixed point notation rounded off to four places following the decimal point. Once the displaying process is started the first step in displaying this number is to address the character line of the memory 10 in which the least significant digit of the exponent, namely "+," is stored and to transfer that digit into the memory buffer register 12 without altering its storage in the memory 10. This step is accomplished by connecting an address selection circuit 14 to the memory 10 for addressing a selected character line of a selected word plane. A nondestructive transfer circuit 16 is also connected to the memory 10 for transferring the digit stored in the selected character line into the memory buffer register 12 without altering the storage of that digit in the memory 10. An address control circuit 18 is connected to the address selection circuit 14 for forcing the address selection circuit 14 to address the word plane of the memory 10 in which the number "−1.234098765 +1" to be displayed is stored and to address the character line of that word plane in which the least significant and in this illustrative case also the most significant and only digit of the exponent, namely "+," is stored. This address control circuit 18 is also connected to the transfer circuit 16 for causing it to transfer the least significant digit of the exponent from the selected character line of the memory 10 to the memory buffer register 12. A sequencing circuit such as a digital controller 20 is connected to the address control circuit 18 for initiating this first step of storing the least significant digit of the exponent in the memory buffer register 12. The digital controller 20 is also connected to other subcircuits as hereinafter described for initiating each step of the displaying process at the appropriate time.

Not all floating point numbers that may be stored in the memory 10 can be displayed in fixed point notation even by rounding them off to some place following the decimal point. Thus, the next step in the displaying process is to determine whether the display is to be in fixed point notation and if so whether the number to be displayed can be displayed in fixed point notation with an accuracy limited only by any rounded off digits following the decimal point or whether it must be displayed in floating point notation because there are more digits preceding the decimal point than can be displayed. Control means 22 is connected to the memory 10 for accomplishing this step and for accordingly causing the displaying process to proceed in either a fixed point mode or a floating point mode. Since it is desired to display the number "−1.234098765 +1" in fixed point notation a mechanical decimal point indicator switch 24 is turned for positioning the decimal point to select the desired number of places, namely four, to be displayed following the decimal point. A fixed point key 26 is also actuated as shown in FIGURE 1 to connect the digital controller 20 to a control decode circuit 28 for causing the displaying process to proceed in the fixed point mode. An overflow circuit 30 is connected intermediate to the digital controller 20 and to the fixed point key 26 and is responsive to storage of the least significant digit of the exponent in the memory buffer register 12 and to the desired number of places following the decimal point as indicated by the decimal point indicator switch 24 for preventing actuation of the fixed point key 26 when a number cannot be displayed in fixed point notation because there are more digits preceding the decimal point than can be displayed. The digital controller 20 is connected to the address control circuit 18 and to the cathode ray tube display 13 for causing the displaying process to proceed in the floating point mode when the fixed point key 26 is deactuated. In this floating point mode, as indicated in the flow diagram of FIGURE 2, each digit of the floating point number from the least significant digit of the exponent to the most significant digit of the mantissa is successively stored in the memory buffer register 12 and during storage in the memory buffer register is formed on the face of the cathode ray tube included in the cathode ray tube display 13.

If the display circuit is to have the capability of storing floating point numbers having multiple digit exponents of the order of plus or minus ten (±10) or higher the displaying process must be altered since these floating point numbers cannot be displayed in fixed point notation and must therefore be displayed in floating point notation. The most significant digit of the multiple digit exponent is then stored in the memory buffer register 12 prior to the least significant digit of the exponent, and the overflow circuit 30 is made responsive to this storage of the most significant digit of the exponent when it is any digit but zero for preventing subsequent actuation of the fixed point key 26 during the process of displaying the number in floating point notation.

Since the number "−1.234098765 +1" can be displayed in fixed point notation rounded off to the fourth place following the decimal point the digital controller 20 is connected by the fixed point key 26 and the overflow circuit 30 to the control decode circuit 28 for causing the displaying process to proceed in the fixed point mode. In the fixed point mode the next step in displaying the number is to select the digit that is one digit less than the least significant digit than can be displayed following the decimal point (hereinafter referred to as the "one digit") and to store that one digit, namely "8," in the memory buffer register 12. The sum of the least significant digit of the exponent, the number of digits to be displayed following the decimal point, and the M subscript representing the binary address of the one digit equals two less than the number of mantissa digits that can be stored and displayed—namely eight for the ten mantissa display positions of the illustrated cathode ray tube display 13. Therefore, the control decode circuit 28 is connected for being responsive to the least significant digit of the exponent, namely "+1," when it is stored in the memory buffer register 12 and to the number of places to be displayed following the decimal point, namely four, as indicated by the decimal point indicator switch 24 to determine the address of the one digit at the same time the overflow circuit 30 is determining whether the number can be displayed in fixed point notation. The control decode circuit 28 is connected to the address selection circuit 14 for causing it to address the character line in which the one digit is stored and to the nondestructive transfer circuit 16 for causing it to transfer this one digit from the memory 10 into the memory buffer register 12 in place of the least significant digit "+1" of the exponent. This operation of the control decode circuit 28 is initiated by the digital controller 20 which is connected to the control decode circuit by the actuated fixed point key 26 and the overflow circuit 30.

The next step in displaying the number "−1.234098765 +1" is accomplished by incrementing means including an increment decode circuit 34 connected to the memory buffer register 12 for determining whether the one digit stored therein is greater than four and including an increment flip-flop circuit 36 connected to the increment decode circuit 34 for being set thereby to an increment state only if the one digit is determined to be greater than four. This increment flip-flop circuit 36 is connected to the memory buffer register 12 and is responsive to being set to the increment state for modifying a digit by adding one to its value when it is subsequently stored in the memory buffer register. The digital controller 20 is connected to the increment decode circuit 34 for initiating this step in which the increment flip-flop circuit 36 is set to the increment state since the one digit, "8", stored in the memory buffer register 12 is greater than four.

The next step in the displaying process comprises several substeps in the first of which the digital controller 20 actuates the address control circuit 18 for incrementing the address selection circuit 14 by one to address the character line in which the least significant digit, namely "9", is stored and for causing the nondestricutive transfer circuit 16 to transfer this least significant digit from the memory 10 into the memory buffer register 12 in place of the one digit "8". The digital controller 20 is connected for actuating the flip-flop circuit 36 so that a digit stored in the memory buffer register 12 during this substep is incremented by one if the increment flip-flop circuit was set to or maintained in the increment state during the next preceding step. Since as described above the increment flip-flop circuit 36 was set to the increment state during the next preceding step, in the next and round-off substep of the present step the least significant digit is incremented by one, namely from "9" to "0," while it is stored in the memory buffer register 12 so that it will be displayed with a value greater by one than its stored value in the memory 10. However, when the increment flip-flop circuit 36 is not set to the increment state the digit stored in the memory buffer register 12 is not altered and is therefore displayed with the same value it has in the memory 10. In the next and carry substep carry means is responsive to the incrementation of the least significant digit from "9" to "0" for incrementing the next least significant digit by one when it is subsequently stored in the memory buffer register 12. This carry means includes a carry decode circuit 38 which is connected to the memory buffer register 12 for determining whether a digit stored therein is incremented from "9" to "0" and includes the increment flip-flop circuit 36 which is connected to the carry decode circuit 38 for being maintained in the increment state only when the digit stored in the memory buffer register is determined to have been incremented from "9" to "0". The digital controller 20 is connected to the decode circuit 38 for initiating this carry substep and is also connected to the cathode ray tube display 13 for initiating the last substep in which the least significant digit finally stored in the memory buffer register 12, namely "0," is formed on the face of the cathode ray tube. Since the addition of one to the value of a digit either due to the round-off substep or to the carry substep which is propagated by the round-off substep is performed upon the digit to be displayed while it is stored in the memory buffer register 12 the memory 10 is unaffected by the round-off process.

The above-described step in displaying the number "—1.234098765 +1" is successively repeated for each digit from the least significant mantissa digit to be displayed, namely "9," to the most significant mantissa digit to be displayed, namely "—1". Thus, the next least significant digit, namely "0," is next stored in the memory buffer register 12 and while stored therein and before being formed on the face of the cathode ray tube is incremented from "0" to "1" because the flip-flop circuit 36 was set to the increment state during the carry substep propagated by the round-off of the least significant digit. Since this next least significant digit is incremented from "0" to "1" and not from "9" to "0" the flip-flop circuit 36 is reset to a nonincrement state so that the remaining mantissa digits "4," "3," . . . "—1" are not incremented when they are stored in the memory buffer register 12 but are formed on the face of the cathode ray tube with the same value they have in the memory 10. The floating point number "—1.234098765 +1" is therefore displayed in fixed point notation rounded off to "—12.3410" without altering the storage of the floating point number in the memory 10. Thus, the inaccuracy ofthe rounded off display is not accumulated during subsequent calculating operations involving the same number.

I claim:

1. A circuit for processing a stored number without altering it to display the number rounded off at the least significant digit to be displayed following the decimal point, said circuit comprising:

- first memory means for storing the number to be displayed;
- processing means connected to said first memory means for successively processing each digit of the number from one digit less than the least significant digit to be displayed to the most significant digit to be displayed without altering the number stored in said first memory means and for incrementing said least significant digit by one only when the value of said one digit is greater than a selected value; and
- display means connected to said processing means for displaying the number rounded off at said least significant digit following the decimal point.

2. A circuit as in claim 1 wherein said processing means increments the next least significant digit by one only when the value of said least significant digit is incremented by one to another selected value.

3. A circuit as in claim 2 wherein said processing means includes:

- second memory means connected to said first memory means for storing a digit of the number;
- control means connected to said first memory means for successively selecting and storing in said second memory means without altering storage of the number in said first memory means each digit of the number from said one digit to said more significant digit;
- incrementing means connected to said second memory means and being responsive to the storage therein of said one digit only when it has a value greater than said selected value for incrementing the value of said least significant digit by one when said least significant digit is stored in said second memory means; and
- carry means connected to said second memory means and being responsive to said least significant digit only when the value thereof is incremented to said other selected value for incrementing the value of said next least significant digit by one when said next least significant digit is stored in said second memory means.

4. A circuit as in claim 3 wherein said control means includes:

- means for determining said one digit and for transferring said one digit from said first memory means to said second memory means without altering storage of the number in said first memory means; and
- means for successively transferring each digit of the number from said one digit to said most significant digit to said second memory means without altering the storage of the number in said first memory means.

5. A circuit as in claim 4 wherein said incrementing means includes:

- increment decode means connected to said second memory means for determining whether the value of said one digit is greater than said selected value; and a multiple state device being responsive to said increment decode means only when it is determined that the value of said one digit is greater than said selected value for incrementing the value of said least significant digit by one when said least significant digit is stored in said second memory means.

6. A circuit as in claim 5 wherein said carry means includes:

carry decode means connected to said second memory means for determining whether the value of a digit stored therein is incremented by one to said other selected value; and said multiple state device being responsive to said carry decode means only when it is determined that the value of said least significant digit is incremented by one to said other selected value for incrementing the value of said next least significant digit by one when said next least significant digit is stored in said second memory means.

7. A circuit as in claim 6 wherein the number is stored in said first memory means in floating point notation and is displayed by said display means in fixed point notation rounded off at said least significant digit.

References Cited

UNITED STATES PATENTS

| | | | |
|---|---|---|---|
| 3,358,125 | 12/1967 | Rinaldi | 235—92 |
| 3,304,417 | 2/1967 | Hertz | 235—164 |
| 3,248,703 | 4/1966 | Moore et al. | 340—172.5 |
| 2,679,035 | 5/1954 | Daniels et al. | 340—165 |

PAUL J. HENON, *Primary Examiner.*

GARETH D. SHAW, *Examiner.*

UNITED STATES PATENT OFFICE

CERTIFICATE OF CORRECTION

Patent No. 3,388,385 June 11, 1968

Joseph A. Lukes

It is certified that error appears in the above identified patent and that said Letters Patent are hereby corrected as shown below:

Column 3, lines 26 and 42, "+", each occurrence, should read -- +1 --.

Signed and sealed this 4th day of November 1969.

(SEAL)
Attest:

Edward M. Fletcher, Jr.
Attesting Officer

WILLIAM E. SCHUYLER, JR.
Commissioner of Patents